US012782151B2

(12) United States Patent
Wu et al.

(10) Patent No.: US 12,782,151 B2
(45) Date of Patent: Nov. 3, 2026

(54) IDENTIFICATION OF GROUPING CRITERIA FOR BULK TRIP REVIEW IN GETTING TAX DEDUCTIONS

(71) Applicant: INTUIT INC., Mountain View, CA (US)

(72) Inventors: Grace Wu, Mountain View, CA (US); Shashank Shashikant Rao, San Jose, CA (US); Susrutha Gongalla, Mountain View, CA (US); Ngoc Nhung Ho, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 234 days.

(21) Appl. No.: 18/497,293

(22) Filed: Oct. 30, 2023

(65) Prior Publication Data

US 2024/0060791 A1 Feb. 22, 2024

Related U.S. Application Data

(63) Continuation of application No. 18/172,103, filed on Feb. 21, 2023, now Pat. No. 11,802,777, which is a continuation of application No. 16/508,238, filed on Jul. 10, 2019, now Pat. No. 11,585,671.

(60) Provisional application No. 62/697,338, filed on Jul. 12, 2018.

(51) Int. Cl.

| | |
|---|---|
| ***G01C 21/36*** | (2006.01) |
| ***G01C 21/34*** | (2006.01) |
| ***G06N 20/00*** | (2019.01) |
| ***G06Q 10/047*** | (2023.01) |
| ***G06Q 40/10*** | (2023.01) |

(52) U.S. Cl.
CPC ....... *G01C 21/3617* (2013.01); *G01C 21/343* (2013.01); *G06N 20/00* (2019.01); *G06Q 10/047* (2013.01); *G06Q 40/10* (2013.01); *Y10S 707/919* (2013.01)

(58) Field of Classification Search
CPC .. G01C 21/3617; G01C 21/343; G01C 21/20; G06N 20/00; G06Q 10/047; G06Q 40/10; Y10S 707/919
See application file for complete search history.

(56) References Cited

U.S. PATENT DOCUMENTS

| | | | | |
|---|---|---|---|---|
| 2016/0035042 A1* | 2/2016 | Bomze | .................. | H04W 4/029 705/30 |
| 2017/0099582 A1* | 4/2017 | Boesen | ................... | H04L 67/52 |

* cited by examiner

*Primary Examiner* — A. Hunter Wilder
(74) *Attorney, Agent, or Firm* — Patterson + Sheridan, LLP

(57) ABSTRACT

Certain aspects of the present disclosure provide techniques for intelligent grouping of travel data for review through a user interface. In one example, a method for providing grouped travel data to a user interface of an application includes receiving travel data from an application running on a remote device; generating one or more travel data-based features from the travel data thereby creating featurized travel data; applying a pattern mining technique to the featurized travel data to detect a plurality of patterns in the featurized travel data; for each trip record in the featurized travel data: determining a plurality of trip record groups in which the trip record falls based on the plurality of patterns; and adding the trip record to a trip record group of the plurality of trip record groups according to a prioritization scheme; and transmitting the trip record group to the application running on the remote device.

17 Claims, 8 Drawing Sheets

IDENTIFICATION OF GROUPING CRITERIA FOR BULK TRIP REVIEW IN GETTING TAX DEDUCTIONS

This Application is a continuation of U.S. patent application Ser. No. 18/172,103, filed Feb. 21, 2023, which is a continuation of U.S. patent application Ser. No. 16/508,238, filed Jul. 10, 2019, which claims priority to and benefit of U.S. Provisional Patent Application No. 62/697,338, filed Jul. 12, 2018, the entire contents of all of which are incorporated herein by reference.

INTRODUCTION

Aspects of the present disclosure relate to intelligent grouping of travel data for review through a user interface.

A common business task is accounting for expenses, such as those related to travel. For example, an individual may use their car for business purposes and subsequently assess that use (including, for example, maintenance, gas, and wear and tear) as an expense against any business income attributable to the use (i.e., "write it off"). In some tax systems, the individual may have to track, collect, and report such business expenses on a regular basis, such as in quarterly or yearly tax filings.

In some tax systems, individuals are given two options for deducting business use vehicle expenses from their related business income. First, the individual may track actual vehicle-related costs (e.g., with gas and maintenance receipts, etc.) and deduct such costs. Second, an individual may track the number of miles driven for business purposes and apply a standard formula (e.g., 54 cents for every mile driven) that converts that mileage into a total deductible expense. For the latter, most individuals use odometer readings to track mileage.

Whereas tracking trip mileage used to be a tedious, manual task, often done by hand, now software applications exist that allow users to actively track mileages and record trips automatically. For example, an individual may have a mobile device with a mobile application that leverages a GPS capability of the mobile device on which the application is running to track mileage automatically. While such a feature is undoubtedly more convenient than the conventional pen-and-paper approach, users of such software applications must still go through the time-consuming and error-prone task of reviewing each recorded trip and manually labeling it as either business related or personal (because personal trips may not be tax deductible).

Compounding the problem of manual labeling (i.e., classification) is that many jobs may require significant numbers of trips, which in-turn require significant amounts of manual labeling. For example, individuals driving personal vehicles for ride-sharing services, delivery services, and other similar vehicle-based services may have hundreds or even thousands of trips in a month to sort through and label. The size and character of the manual labeling task makes it one that promotes mistakes, if it is done at all. In fact, many individuals simply forgo the task either not realizing or simply accepting the fact that they are losing significant tax savings as a consequence.

Accordingly, what is needed is a way to intelligently group travel data for review through a user interface.

BRIEF SUMMARY

In one embodiment, a method for providing grouped travel data to a user interface of an application includes: receiving travel data comprising a plurality of trip records from an application running on a remote device; determining one or more travel data-based features from the travel data; creating featurized travel data based on the one or more travel data-based features; applying a pattern mining technique to the featurized travel data to detect a plurality of patterns in the featurized travel data; for each respective trip record in the featurized travel data: determining a plurality of trip record groups in which the respective trip record falls based on the plurality of patterns; and adding the respective trip record to a trip record group of the plurality of trip record groups according to a prioritization scheme; and transmitting the trip record group to the application running on the remote device.

In another embodiment, a method for providing grouped travel data in a user interface of an application includes: gathering travel data by an application executing on a mobile device; sending the travel data to a remote server; receiving grouped trip records from the remote server, wherein the grouped trip records are based on patterns in the travel data sent to the remote server; displaying the grouped trip records in a user interface of the application; and providing a first user interface element configured to cause each trip record of the grouped trip records to be labeled by a single user interface interaction with the first user interface element.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
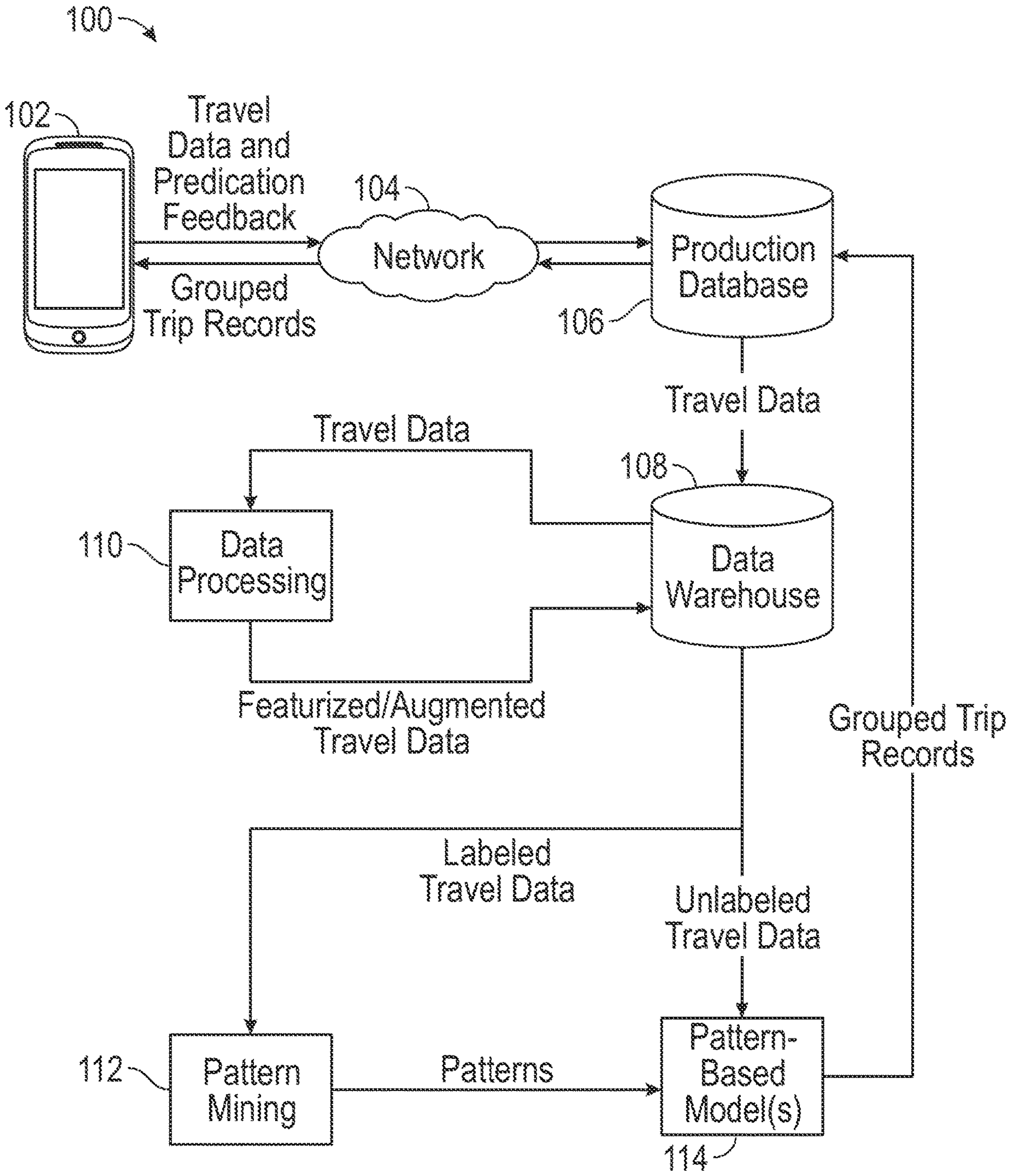
FIG. 1 depicts a system for grouping travel data for group review through a user interface.

Aspects of the present disclosure provide apparatuses, methods, processing systems, and computer readable mediums for intelligently grouping travel data for review through a user interface.

Grouping travel data, such as trips taken in a vehicle, and presenting the groups to a user through an application user interface allows for the user to more quickly and efficiently label (i.e., classify) the travel data. For example, through such a user interface, a user may be able to label many trip records as business-related or personal with a single input.

However, to be most useful, the grouping should be dynamic and user-centric. This is because simple and static rules for grouping travel data (e.g., trip records) may not work correctly within diverse populations of users or over time as users' trip patterns change. For example, a first user working as a ride-share provider and driving regular hours every day, but driving to irregular locations based on essentially random customer requests, may have significantly different trip patterns than a second user working as a realtor and driving at irregular hours, but to more regular locations (such as between an office and certain listed properties).

Embodiments described herein augment user trip data (e.g., start and end coordinates and timestamps) through data transformation to derive additional trip attributes, such as day of week, time of day (e.g., morning, afternoon, evening), time of week (e.g., weekday or weekend), and others. Further, in some embodiments the starting and ending coordinates of trips are grouped where there is a common location (e.g., a place of business) associated with each. The trip data, including the additional trip attributes, are then processed using pattern mining techniques in order to detect patterns (e.g., combinations of trip data attributes) that are indicative of trip type (e.g., personal or business). Finally, the patterns are prioritized to generate a group of trips with predicted types for a user to review in bulk.

Embodiments described herein represent many improvements over conventional methods. For example, grouping travel data for review in a user interface based on user-specific data patterns provides for significantly faster and more comprehensive reviews as compared to conventional methods. Further, grouping travel data based on detected patterns in the trip data and related derived trip data attributes increases the accuracy and consistency of labeling (i.e., classification) as compared to conventional methods. Further yet, grouping travel data for review in a user interface in a compact manner that allows a user to make bulk labeling decisions with minimal user interface interaction improves the utilization of device resources, such as a screen real estate, and battery life (because the labeling can be completed much more quickly as compared to conventional methods). For a user, the grouping may improve the consistency with which the labeling is completed and the accuracy of the labeling, which leads to more accurate tax filings and potentially reduced taxes. Further, the intuitiveness and efficiency of the application user interface employing grouping may lead to higher application usage rates and more committed application users, which in-turn drives the accuracy of the prediction models due to the increase in user data usable for training and validation of the prediction models. The aforementioned are only a few of the improvements of conventional technologies, and other benefits will be apparent to those of skill in the art.

Example System Architecture for Grouping Travel Data

FIG. 1 depicts a system 100 for grouping travel data for group review through a user interface. System 100 includes production database 106, which receives travel data from users. For example, production database 106 may receive travel data in the form of trip records from an application running on user device, such as mobile device 102 over network 104. In some examples, mobile application 102 may be a personal or business finance application that includes an automatic trip or mileage tracking function. In other examples, mobile application 102 may be a dedicated mileage tracking application.

Network 104 may be any sort of data communication network capable of carrying travel data from a user device, such as mobile device 102, to production database 106. For example, network 104 may be a local area network, wide area network, cellular network, ad-hoc network, near-field communication network, the Internet, or any other known or later developed network.

Mobile device 102 may be any form of electronic device capable of running applications and communicating data over a network interface. For example, mobile device 102 may be a smartphone, tablet computer, laptop computer, smart wearable device, autonomous or semi-autonomous vehicle, and other electronic devices capable of determining their location and communicating over a data network, such as network 104.

In some examples, production database 106 may receive travel data from a user device, such as mobile device 102, at regular intervals (e.g., once a day) or continuously (e.g., while the mobile application is running in the foreground or background). Alternatively, production database 106 may include an agent or other function that requests the travel data from remote mobile applications, such as may be installed on mobile device 102.

The travel data received by and stored in production database 106 (e.g., from mobile device 102) may be in the form of trip records that include, among other things, location data (e.g., in GPS or other location coordinates), such as starting and finishing locations and route locations. The trip records may also include times, which in some cases may be based on timestamps associated with the location data. Further the trip records may include various types of metadata, such as what type of vehicle the trip was made in, how much time elapsed during the trip, how much gas was used during the trip, and many others.

In some cases, the trip records may include label data (e.g., a trip type such as business or personal) when received by production database 106, such as when a user has already labeled the trip records. Other trip records may only include location data or may include location data and other ancillary data (e.g., type of vehicle) that is not necessarily determinative of trip type.

Travel data (such as trip records) received by production database 106 may be stored in data warehouse 108. For example, a server hosting production database 106 may be configured for speed and thread capacity (e.g., to handle traffic from many users), whereas data warehouse 108 may be hosted by a server configured for storage capacity and resiliency.

Travel data stored in data warehouse 108 may be processed, such as by data processing module 110, in order to derive additional travel data features or attributes, such as trip attributes. For example, travel data including a start location and time (e.g., timestamped GPS coordinates) and an end location and time may be processed to derive other attributes. In some cases, the attributes may be categorical, such as deriving a time of day for the trip (e.g., morning, afternoon, evening), or a time of week (e.g., weekend or weekday), or a day of the week (e.g., Tuesday), etc. Notably, these are just a few examples of the types of trip attributes that may be derived based on the travel data.

In some implementations, unsupervised machine learning techniques such as k-means, hierarchical clustering, density-based clustering (e.g., density-based spatial clustering of applications with noise (DB SCAN)), and other clustering techniques may be applied to the travel data (before or after featurization and/or augmentation) to transform similar starting and/or ending coordinates to known locations. For example, geocoding (e.g., via geohash) may be applied to coordinates to associate them with known locations. These are just some examples, and additional featurization opportunities are further discussed below with respect to FIG. 2.

After processing by data processing module 110, featurized and/or augmented travel data (e.g., augmented with additional attributes and/or features) may be stored in data warehouse 108 for further use by system 100.

In the depicted example, labeled travel data (e.g., trips labeled as "business" or personal") arriving at data warehouse 108 by way of production database 106 may be sent to pattern mining module 112 for purposes of training pattern-based models 114. In some examples, an agent of data warehouse 108 may automatically determine that newly received data is labeled (i.e., classified) with a type (e.g., business or personal) and may thereafter send the labeled travel data to pattern mining module 112. In other examples, pattern mining module 112 may periodically or continuously send requests to data warehouse 108 for new labeled travel data. In yet other examples, production database 106 may send labeled travel data to pattern mining module 112 directly as well as sending the same travel data to data warehouse 108. The labeled travel data may come from, for example, user devices where users have labeled travel data as, for example, business or personal.

Pattern mining module 112 is used to create one or more pattern-based models 114 based on, for example, labeled travel data (e.g., trip records labeled as either business or personal). In some examples, pattern mining module 112 may perform supervised rule-based machine learning techniques, such as Frequent Pattern Mining (FPM) to create pattern-based models 114.

Frequent pattern mining (also referred to as association rule mining or association rule learning) is an analytical process, which may be implemented in algorithms, that finds frequent patterns, associations, or causal structures in data sets, such as those found in relational databases, transactional databases, and other data repositories. For example, given a set of transactions, FPM aims to find the rules that enable a reliable prediction of the occurrence of a specific item based on the occurrence of other items in the transaction. FPM can be designed to discover various types of patterns, such as subgraphs, associations, indirect associations, trends, periodic patterns, sequential rules, lattices, sequential patterns, and high-utility itemsets. Notably, patterns may be characterized both by occurring frequently in a data set, or by occurring infrequently (i.e., being rare).

Various algorithms may be utilized for frequent pattern mining, such as the Apriori Algorithm, Eclat Algorithm, FP-Growth algorithm, and others.

The various patterns identified by pattern mining module 112 may be analyzed, tested, and prioritized so that only the best patterns are ultimately put into use as pattern-based models 114. For example, only those patterns with high confidence levels (e.g. of business or personal prediction) may be deployed as pattern-based models 114.

Pattern mining module 112 may also use pattern detection techniques such as creating a list of feature combinations to look for so that the module may identify frequently occurring patterns from the list of feature combinations.

Pattern-based models 114 receive unlabeled travel data as input from data warehouse 108 and outputs predicted groupings of the travel data. For example, prediction model may receive a set of unlabeled trip records from data warehouse 108 and determine that a first subset of the set are predicted to be business trips and a second subset of the set are predicted to be personal trips. Pattern-based model 114 may also output a third subset of the set for undetermined trip records (e.g., where the record cannot confidently be predicted as either business or personal). Notably, in this example "business" and "personal" are the labels predicted by pattern-based model 114, but in other examples there may be more labels and different labels as compared to this example. The predicted groupings of travel data are sent back to production database 106 so that they may be subsequently transmitted back to a user as grouped travel data, such as back to the mobile application running on user device 102. The grouped travel data may be presented to a user in the application so that the user may quickly label the entire group with a minimal input (e.g., a single interaction with a graphical user interface, such as clicking on one user interface element like a button).

In some examples, each pattern-based model 114 is a user-specific prediction model based on labeled travel data and feedback from the user. In this way, pattern-based models 114 may be user-centric and thus flexible and adaptive to a wide variety of user types.

In some examples, pattern-based models 114 are a type of supervised pattern matching algorithms such as Frequent Pattern Mining, which aggregate trips based on pre-set grouping criteria. For example, techniques such as Frequent Pattern Mining can automatically discover patterns in trips taken by a user. In one example, if a user always marks trips from location A to location B as business in the past 90 days, this may be stored as a pattern for the user and be used subsequently for automatically grouping all trips from location A to location B as business trips. Pattern-mining approaches may identify many patterns for each individual user. In some examples, pre-set patterns for a user are used. For example, pre-set patterns may include, by way of example: "trips starting from location A and ending in location B", "trips occurring in the morning over weekdays", "trips occurring over weekend", etc. Such pre-set patterns may be used to systematically search user's travel data (e.g., trip records) to determine the patterns with the most number of trip records. The patterns matching the most trip records may be used for grouping new trip records going forward. In some examples, a threshold number or percentage of trip records must be applicable to a pattern in order for that pattern to be deployed as one of the pattern-based models 114.

In some cases, one or more of production database 106, data warehouse 108, data processing module 110, pattern mining module 112, and pattern-based model 114 may be resident, individually or collectively, on one or more servers. For example, in some cases production database 106 is resident on an external network facing server, while data warehouse 108 is on a non-externally accessible server. Further, pattern mining module 112 and pattern-based models 114 may be resident on special-purpose, high-performance servers in data communication with production database 106 and data warehouse 108.

Notably FIG. 1 is depicted with a selected group of features for clarity and simplicity, but there may be many additional elements of system 100. For example, production database 106 may be behind a firewall and accessible only via a gateway or application programming interface (API).

System 100 for intelligently grouping travel data has many uses, including, for example, grouping trips for a personal or business finance application (mobile or desktop). As discussed above, this allows users of such applications to review trip records in groups of many at a time (i.e., in "bulk"), which saves the users significant time and effort. Further, grouping travel data via system 100 may allow for automatic identification and prioritization of high-value business trips for users so they can maximize their tax deductions.

The predicted groupings can be used as the basis of suggested rules for users. For example, a suggested rule based on the predictions can be presented to a user (e.g., through a graphical user interface of mobile device 102) and the user can confirm or change the suggested rule before accepting. Such rules may then automatically label future trip records (e.g., as business or personal) based on the criteria in the rule. For example, a rule may state "always label trips from start location A to end location B as business." Thus, the initial predictions from pattern-based models 114 may further enhance the application by automating rule generation, which in-turn further increase the efficiency of reviewing trip records.

Further yet, the predictions provided by system 100 may be used as inputs to other predictive algorithms. For example, trip record patterns may be used as a proxy for a user's profession or industry, and that information may be used to further personalize the user's experience. Returning to the ride-sharing example discussed above, a user taking many trips every day in different areas may be more likely to be working in the ride-sharing industry. Such a determination (i.e., of a predicted industry) may be used as weighted data for another model (e.g., weighted based on the confidence of the prediction).

The predicted groupings generated by system 100 may also be used to improve the prediction model because the predictions can generate user feedback as to the correctness of the grouping (e.g., through AB testing). Improvements could include re-prioritizing the patterns used for grouping and tuning the pattern mining techniques used for identifying trip patterns, as just a few examples. For example, if a user always dismisses grouping based on a certain criteria such as start location, pattern mining module 112 may use that feedback to refined pattern-based models 114, which may result in the certain criteria no longer being used or being used less frequently for grouping.

Example Process Flow for Grouping Travel Data

Figure 2:
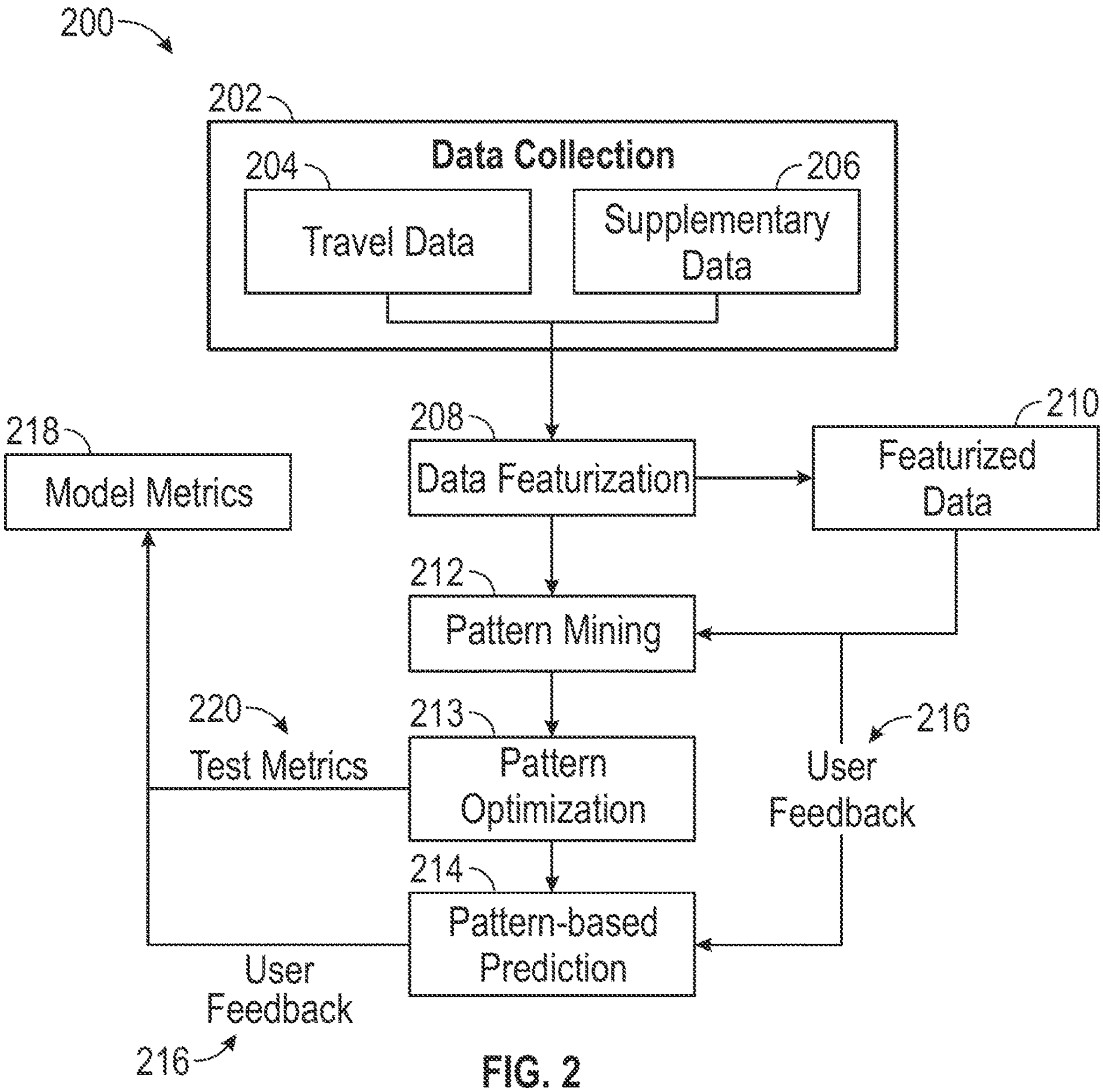
FIG. 2 depicts a process flow for grouping travel data.

FIG. 2 depicts a process flow 200 for grouping travel data. Process 200 begins with data collection step 202. For example, travel data 204 may be collected from users, such as from applications running on user devices, as described above with respect to FIG. 1. Travel data may include trip records that include, for example, location coordinates (e.g., GPS coordinates) for starting and ending points of a trip as well as time data (e.g., start and end time of a trip). As described above, travel data may also include other metadata about the trip.

Other, supplementary data 206 may also be collected to improve the detection of patterns in step 212. For example, supplementary data 206 may include: user-specific data, such as a user's industry or login behavior; travel metadata, such as location names (as provided through map APIs or other models) and other types of data that is related to users and trips performed by users.

The data collected during data collection step 202, such as travel data 204 and supplementary data 206, may be augmented and/or featurized in data featurization step 208 (such as by a data processing module like module 110 in FIG. 1). Featurization may include an ensemble of data preparation and transformation steps to remedy inherent issues in large data sets, such as inconsistent data sources, missing values, inconsistent or incompatible data types (e.g., structure/categorical, unstructured, time series, etc.), noisy or dirty data, skewed data, and other known issues. Further, transformations included as part of data featurization 208 may better prepare the data for use with machine learning techniques. Example transformation techniques include: normalization or standardization, categorization, dummification of categorical variables, binning, dimensionality reduction, filtering, new feature creation (e.g., based on formulas), feature hashing, natural language processing (NLP), token annotation, bag-of-words vectorization, sentence annotation, speech element identification, lemmatization or stemming, and others.

In the context of the travel data, featurization may include transformations such as extracting or predicting the time of day (e.g., morning, afternoon, evening), day of week (e.g., Tuesday), time of week (e.g., weekend or weekday), work hours, etc. from a timestamp of when a trip started or ended, distance travelled in one trip based on start location and end location, and getting more coarse location coordinates based on more fine grained ones. For example, if there are different locations where someone parks their car around their home, they can all be considered as one location within a bigger radius around their home. To this end, featurization may include predicting "hot spots", which are defined regions (e.g., encompassing a plurality of locations) that are associated with certain classification data and/or other descriptive data that assists in classifying future trips with origin locations or destination locations that fall within the hot spot. By way of example, a hot spot may encompass a region such as a city block, neighborhood, entire town, or an area that a given user may frequency for a particular purpose. Methods for predicting and using hot spots are described in Applicant's co-pending U.S. application Ser. No. 15/913,812, filed Mar. 6, 2018, which is hereby incorporated by reference in its entirety.

Data that is featurized at step 208 is stored in a featurized data repository at step 210. In this way, the featurized data may be used for present and future pattern mining, such as at step 212.

Pattern mining step 212 uses data from data featurization 208 and/or from stored featurized data 210 to perform pattern mining techniques, such as described with respect to pattern mining module 112 in FIG. 1, above. The output of pattern mining step 212 may be one or more (e.g., a plurality) of patterns based on the featurized data. The patterns are ultimately used to enable presentation of multiple trip records to users in groups such that users may label the trips at once (i.e., in a bulk transaction). Thus, the patterns enable a more efficient and appealing user interface for users that need to review many trips, for example, as part of their tax preparation.

In some examples, pattern mining step 212 may include partitioning featurized data into a training data set, which may include a range of data prior to a set date, as well as a test data set, which may include a range of data after the set date, and which may be used in pattern optimization step 213. For example, test data may comprise featurized data from three months prior to a set date and test data may comprise featurized data from a week to a few weeks (e.g., one to four weeks) after the set date. Notably, these timelines for defining data sets are just examples and other timelines may be used.

Pattern optimization 213 is used to analyze and select or prioritize patterns created in pattern mining step 212 for use in pattern-based prediction models. A single trip can fall into multiple eligible groupings based on overlapping patterns. For instance, trips occurring in mornings over weekdays could be grouped along with all trips occurring only in the mornings, or all the trips occurring only over weekdays. Because there are virtually limitless ways to group trips based on different features and/or attributes, such as those created in featurization step 208, pattern optimization is used to select or prioritize the mined patterns that perform best without the processing overhead of considering all possible patterns. Such optimization may significantly improve system resource usage, such as memory and processing power.

Optimization of the selected or prioritized patterns may be dependent on multiple factors, such as how good the grouping is in terms of reducing the time necessary for a user to perform bulk review trips, reducing the number of misclassifications as business/personal, etc. for an individual user or across all users. Using an example discussed above, a pattern based on time of week (e.g., weekend versus weekday) may be selected or prioritized over a pattern based on time of day (e.g., morning, afternoon, or evening) if the pattern based on time of week creates more reliable and/or larger groups of trips for a user to bulk classify (i.e., label).

In some examples, pattern optimization step 213 may include testing the one or more patterns created in pattern mining step 212 against the test data to determine test metrics 220 regarding the patterns. For example, each pattern may have an associated confidence level, recall, and precision. Confidence may refer to the percentage likelihood that a trip grouped as, for example, business is indeed a business trip. Precision, which may also be referred to as positive predictive value, refers to the proportion of positive identifications that are actually correct; for example, the number of trips grouped as predicted business trips that are actually business trips. Recall, which may also be referred to as sensitivity, refers to the proportion of actual positive identifications that are identified correctly; for example, the number of trips grouped as predicted business trips out of the total number of business trips in the considered data. Such test metrics 220 may be stored in a model metrics repository, such as in step 218

In one example, pattern mining step 212 and pattern optimization step 213 may create user-specific pattern-based prediction models that are personalized to each user for which there is sufficient data. For example, if a user has sufficient travel data that is already labeled as business or personal, then personalized pattern-based prediction model may be mined and optimized in steps 212 and 213.

In another example, pattern mining step 212 and pattern optimization step 213 may create multi-user (e.g., industry-specific) pattern-based prediction models. Such models may be created when supplementary data 206 collected during the data collection step 202 enables matching users by shared attributes, such as industry. For example, a new user in the ride-share industry may not have sufficient personal travel data to train a user-specific pattern-based model, but the travel data marked as business or personal by other users in the same industry may provide a basis for training a pattern-based prediction model applicable to the new user. Consequently, even new users with small user-specific data sets benefit from the creation of multi-user (e.g., industry) models.

In yet another example, pattern mining step 212 and pattern optimization step 213 may create a user-specific model based on another user that is similar to the user according to supplementary data 206. For example, one or more attributes of a new user (e.g., industry) without significant travel data may match one or more existing users with significant travel data, and this may form the basis of creating an initial pattern-based prediction model for the new user based on the existing user with matching attributes. So a new user starting to capture ride-sharing travel data may benefit from a user-specific model based on another user with significant ride-sharing travel data. In this regard, ride-sharing is just one example, and users may be matched based on many other attributes.

The output of the pattern mining step 212 and pattern optimization step 213 may include a plurality of pattern-based prediction models, including user-specific and multi-user specific pattern-based prediction models. For example, each pattern-based prediction model may comprise one or more patterns that indicate if travel data (e.g., a trip record) should be grouped in one way or another, such as business or personal. If a specific user always labels trips from location A to location B as business-related, pattern mining step 212 may identify that recurrence as a pattern forming part of a pattern-based prediction model for the user. As another example, the same user may always mark trips taken over weekends as personal, and thus pattern mining step 212 may identify another pattern forming another part of the grouping model for the user.

At step 214, the pattern-based prediction models are used to predict groupings based on received data, such as travel data. For example, user-specific travel data may be provided to a user-specific pattern-based prediction model to predict groupings of the travel data, such as groups of business related trip records that take place during a certain time of day or week, or which start or end at a certain location, etc.

The pattern-based predictions made at step 214 may be utilized by user applications, such as personal or business finance applications. In some cases, such applications include graphical user interfaces to present the predicted groups to the user. The user may review the predicted groups and either confirm the entire group, confirm part of the group, or disconfirm the entire group. Thus, the pattern-based predictions at step 214 may result in user feedback 216.

User feedback 216 may be used to further refine pattern-based models, such as by providing additional labeled data of known correctness (i.e., ground truth data) for use in pattern mining step 212. Further, user feedback 216 may be stored in metric data repository, such as model metrics repository 218, to measure overall performance of the grouping models and other aspects of process 200. For example, metrics such as precision and recall may be calculated for each user-specific model as well as each multi-user model. In some cases, the median performance of all individual grouping models may indicate the overall performance a system for intelligently grouping travel data for group review, such as described with respect to FIG. 1.

Figures 3A, 3B:
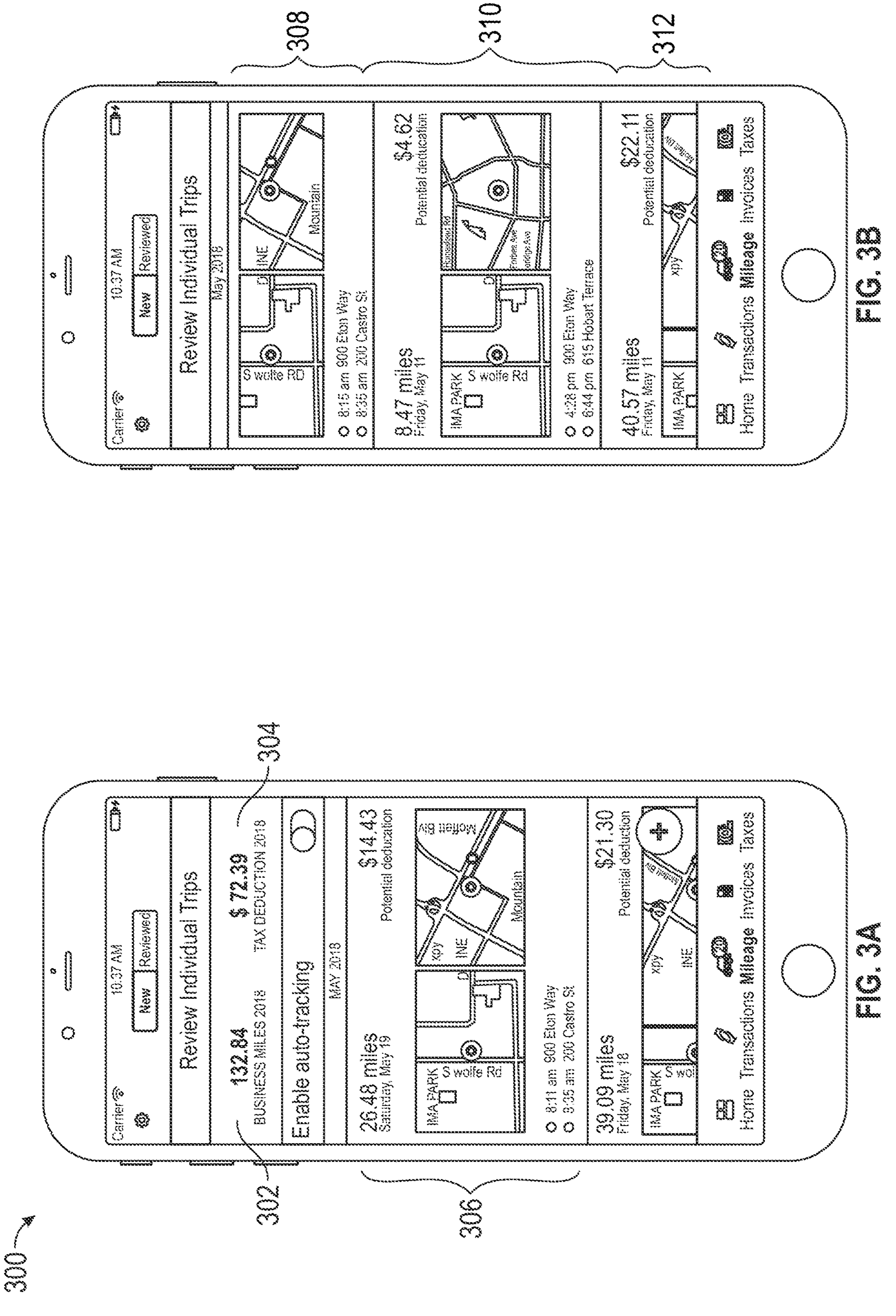
FIGS. 3A-3D depict examples of a conventional user interface for performing review of travel data.

FIGS. 3A-3D depict examples of a user interface for performing review of travel data. In particular, FIG. 3A depicts a user interface screen of a mobile device, such as mobile device 102 described with respect to FIG. 1. The user interface screen 300 in FIG. 3A includes a plurality of user interface elements, such as a total deducted miles field 302, a total tax deduction field 304, and a plurality of individual trip records 306.

FIG. 3B depicts the same user interface as FIG. 3A, but in this case the list of individual trip records has been scrolled down to show that there are many additional individual trip records, including 308, 310, and 312. Further, it is apparent that the list of single trip records can only show a few trip records at a time (in this case three) owing to the limited screen size of the mobile device. This physical limitation of the mobile device results in a user having to do a significant amount of interacting with the user interface, such as by scrolling the list up and down, looking at small type, etc. in order to label a trip record a certain way. Even with a traditional computer, such as a laptop or desktop, the list may be too long to see any appreciable portion at one time.

Figure 3D:
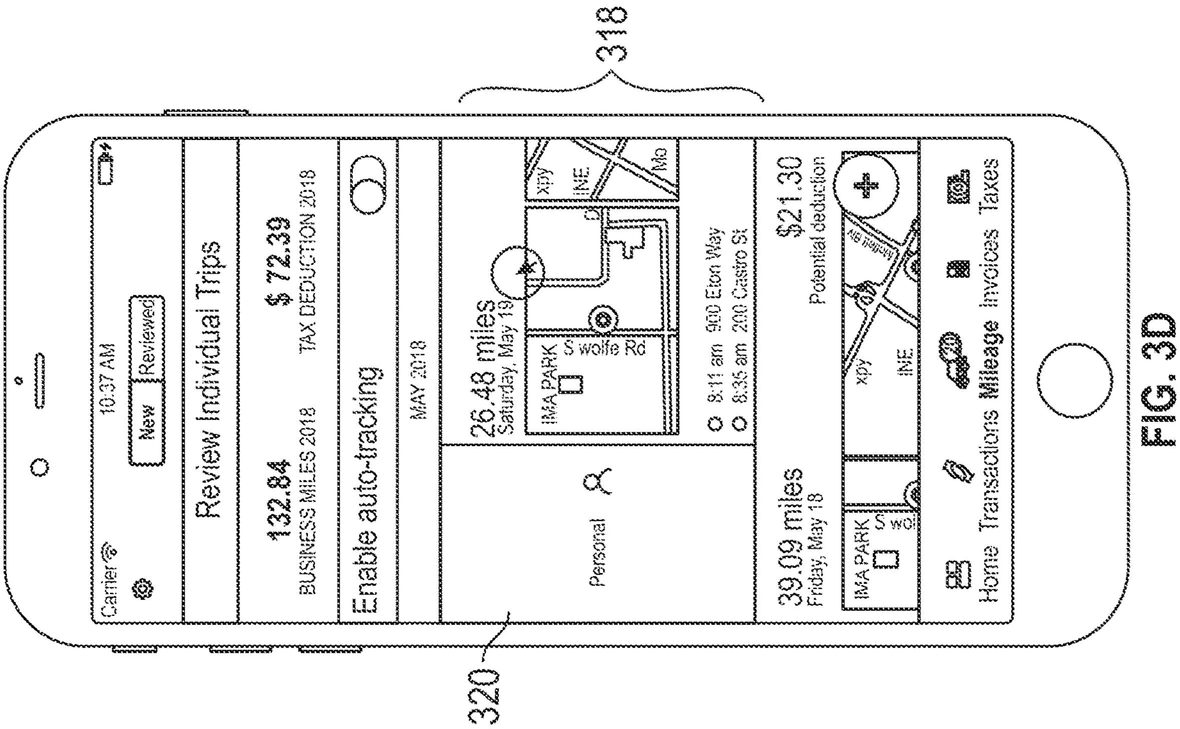
Figure 3C:
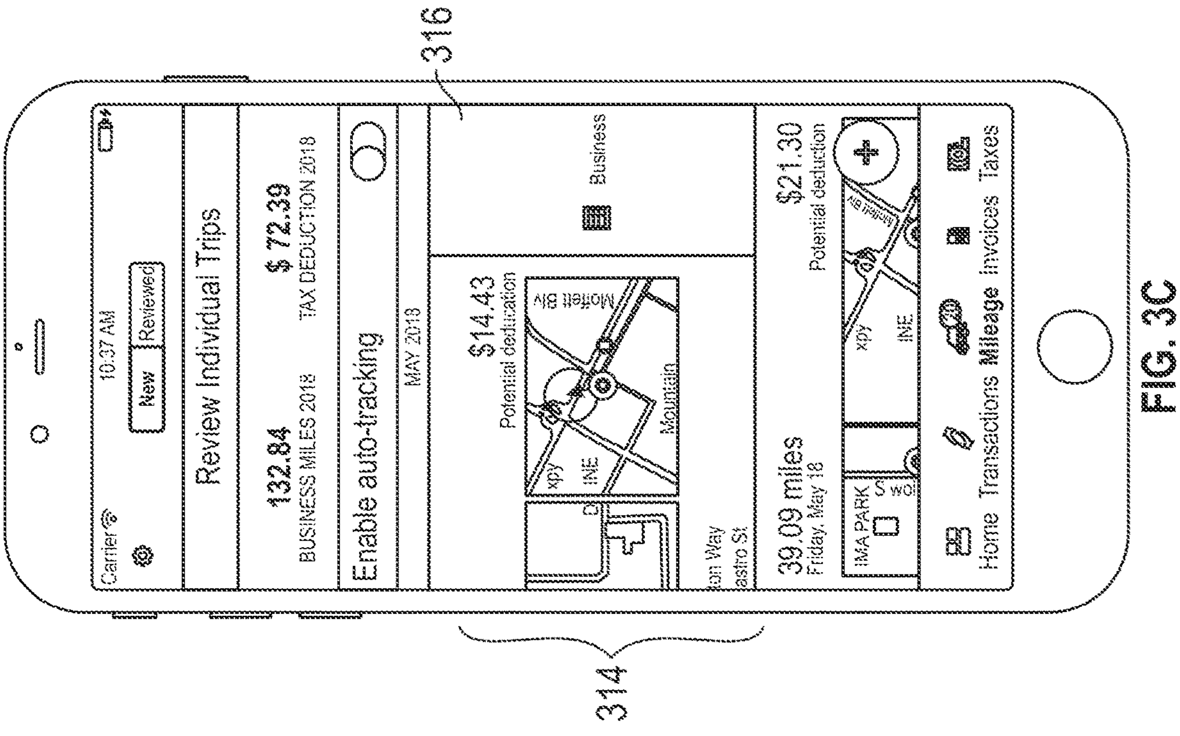

FIG. 3C depicts an example of a user applying a label (i.e., classification) to a single trip record 314 within user interface 300. In this example, the user touches the trip record 314 and swipes left to reveal another user interface element 316 (here, a button) for labeling the trip as business related. While user interface 300 is functional, it nevertheless requires a significant amount of interaction by a user to label each and every trip record. As discussed above, even in a relatively short period of time, such as a few weeks or a month, a user may generate hundreds or thousands of trip records that need review. The sheer number of trip records to review may cause a user to abandon the task before completing it, or to forgo the review all together. Further, with so many repeated tasks necessary to individually label all of the trip records (e.g., 306, 308, 310, and 312), it is possible that the user may make labelling mistakes.

FIG. 3D depicts another example of a user applying a label to a single trip record 314. In this example, the user touches the trip record 318 and swipes right to reveal another user interface element 320 (here, another button) for labeling the trip as personal.

As depicted in FIGS. 3A-3D, user interface 300 allows for a user to easily label individual trip records. However, as the number of trip records grows in number, such as may be the case with a user whose business requires significant travel by car, the task of individually labeling each trip record grows unwieldy. This is especially true where a physical device constraint, such as the size of a display screen, may increase the amount of interaction with the user interface 300 necessary to complete the labeling task.

Figure 4A:
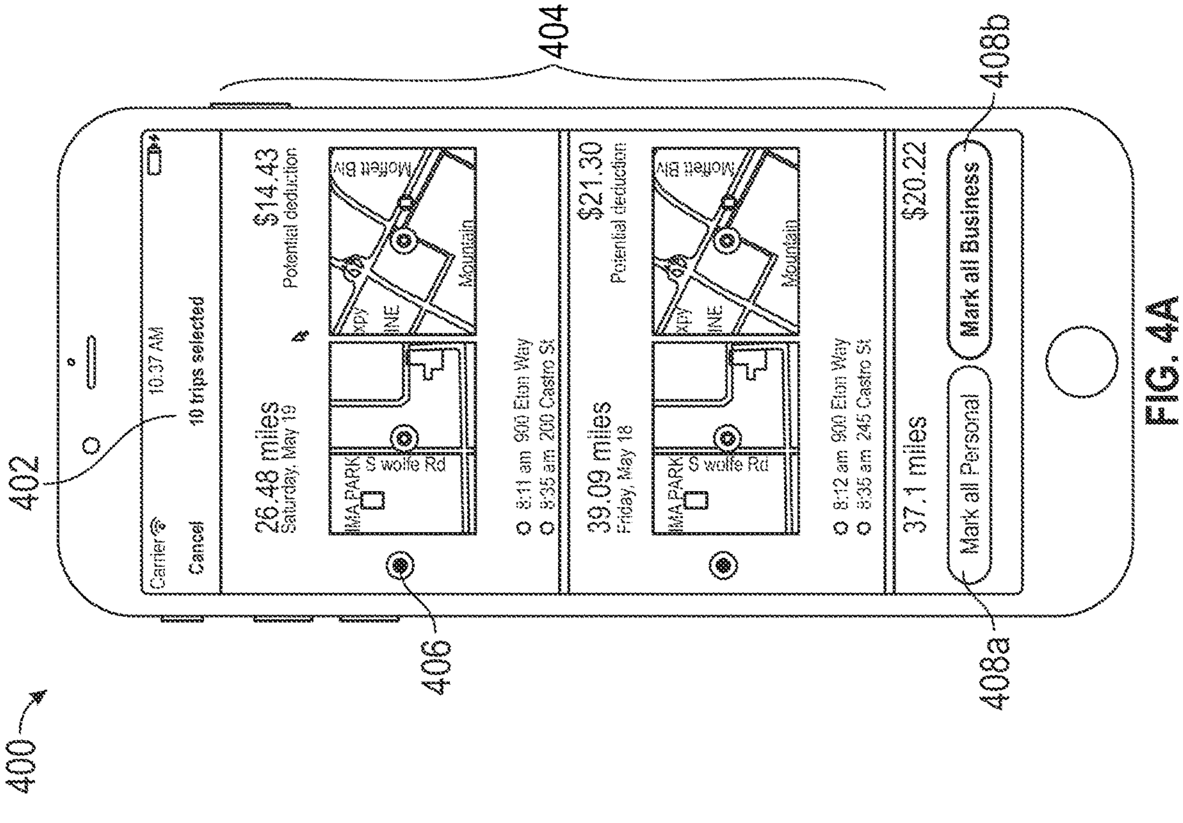
FIGS. 4A-4B depict examples of a user interface for performing group review of travel data.
Figure 4B:
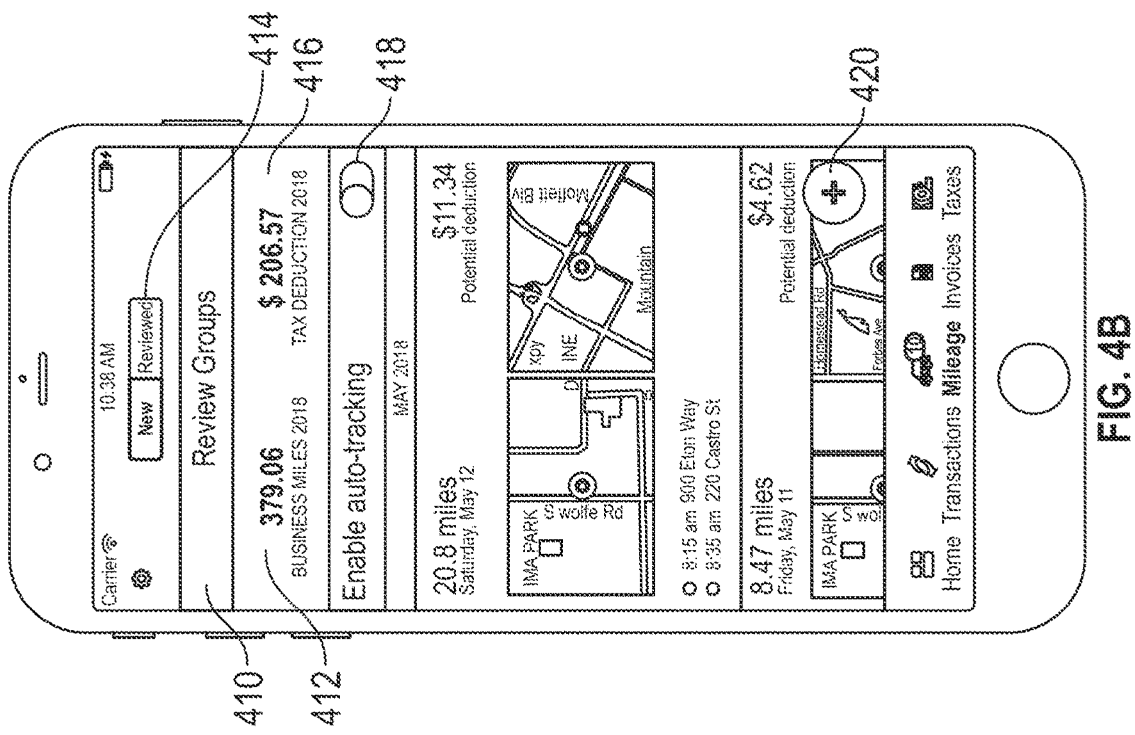

FIGS. 4A-4B depict examples of a user interface 400 for performing group review of travel data, such as trip records.

In particular, FIG. 4A shows a screen of a user interface 400 of an application that runs on a mobile device, such as mobile device 102 described with respect to FIG. 1. In some examples, the application may be a personal or business finance application.

User interface 400 includes a user interface element 402, in this case a banner indicator, which denotes a number of trips that have been grouped together by a pattern-based model, such as pattern-based models 114 described with respect to FIG. 1 and pattern-based prediction step 214 described with respect to FIG. 2. In the depicted example, ten trip records 404 have been grouped together by a pattern-based model, such as described above.

User interface 400 includes user interface element 406, which in this example is a selectable radio button, which allows a user to exclude automatically grouped trip records from a group. For example, if a user scrolled through the group and noticed that one trip was not appropriately grouped, the user could de-select that particular trip record and thereafter label the remaining trips in the automatically generated group.

In the example of FIG. 4A, the group of trip records has been grouped according to pattern-based models, but the label of the group is up to the user to determine via use of one of user interface elements 408*a* and 408*b*, which in this case are buttons for labeling all trip records in the group as either "Personal" (via button 408*a*) or as "Business" (via button 408*b*). For example, the group of trip records may be formed by patterns such as time of day, time of week, starting location, ending location, trip time, trip distance, and other features and attributes as described herein.

When a user selects to, for example, "Mark all as Personal" or "Mark all Business" in user interface 400, the underlying application may send feedback (e.g., of the correctness of the grouping) to a remote application server, such as a server hosting production database 106 in FIG. 1. For example, the feedback may be in the form of labeled travel data that can be used to further refine a pattern-based model, as described with respect to pattern mining module 112 in FIG. 1, and as described with respect to user feedback 216 and pattern mining step 212 in FIG. 2, above. Similarly, when a user deselects a trip record from a grouped set of trip records, for example by unselecting user element 406, the underlying application may send further feedback (e.g., of the incorrectness of the grouping). In this way, the user's interaction with user interface 400 can be used to further refine patterns used for pattern-based predictions. Further, as described above, because the prediction models can be user-specific, such feedback helps to further customize the user-specific pattern-based prediction models to the user's trip habits.

In some examples, button 408*a* or 408*b* may be preselected (e.g., by highlighting, color change, or some other emphasis) in order to indicate a prediction of the type of trip records that are grouped.

FIG. 4B depicts another screen of user interface 400 in which additional user interface elements are demonstrated. For example, user interface element 410 is a banner button allowing the user to switch from an individual trip record review mode (such as described with respect to FIGS. 3A-3D), to a group review mode.

User interface element 412 displays a current number of business miles filed, which is based on trip records labeled by the user. User interface element 416 displays a related tax deduction field 416, which demonstrates a relationship between the number of business miles from trip records labeled as "Business" and the associated tax deduction available based on those business trip records. User interface element 414 includes two alternate option buttons that allow a user to view "New" trip records that have not yet been "Reviewed" (i.e., labeled) or to view "Reviewed" trip records. In this example, user interface element 418 is a toggle button that allows a user to turn on or off auto-tracking, which enables the application to track and record trips automatically instead of manually inputting trips, such as by use of the add button of user element 420.

As displayed in the example of FIG. 4B, the amount of business miles indicated by user interface element 412 and the associated tax savings indicated by user interface element 416 may be expected to be higher (for example, as compared to the examples in FIGS. 3A-3D) when a user can quickly and reliably label groups of trip records.

Though FIGS. 4A-4B depict a user interface 400 on a mobile device, the same concepts of group review of travel data are equally applicable to other types of computing devices, such as tablets, laptop and desktop computers, smart wearable devices, and other electronic devices with display and user input capabilities.

Figure 5:
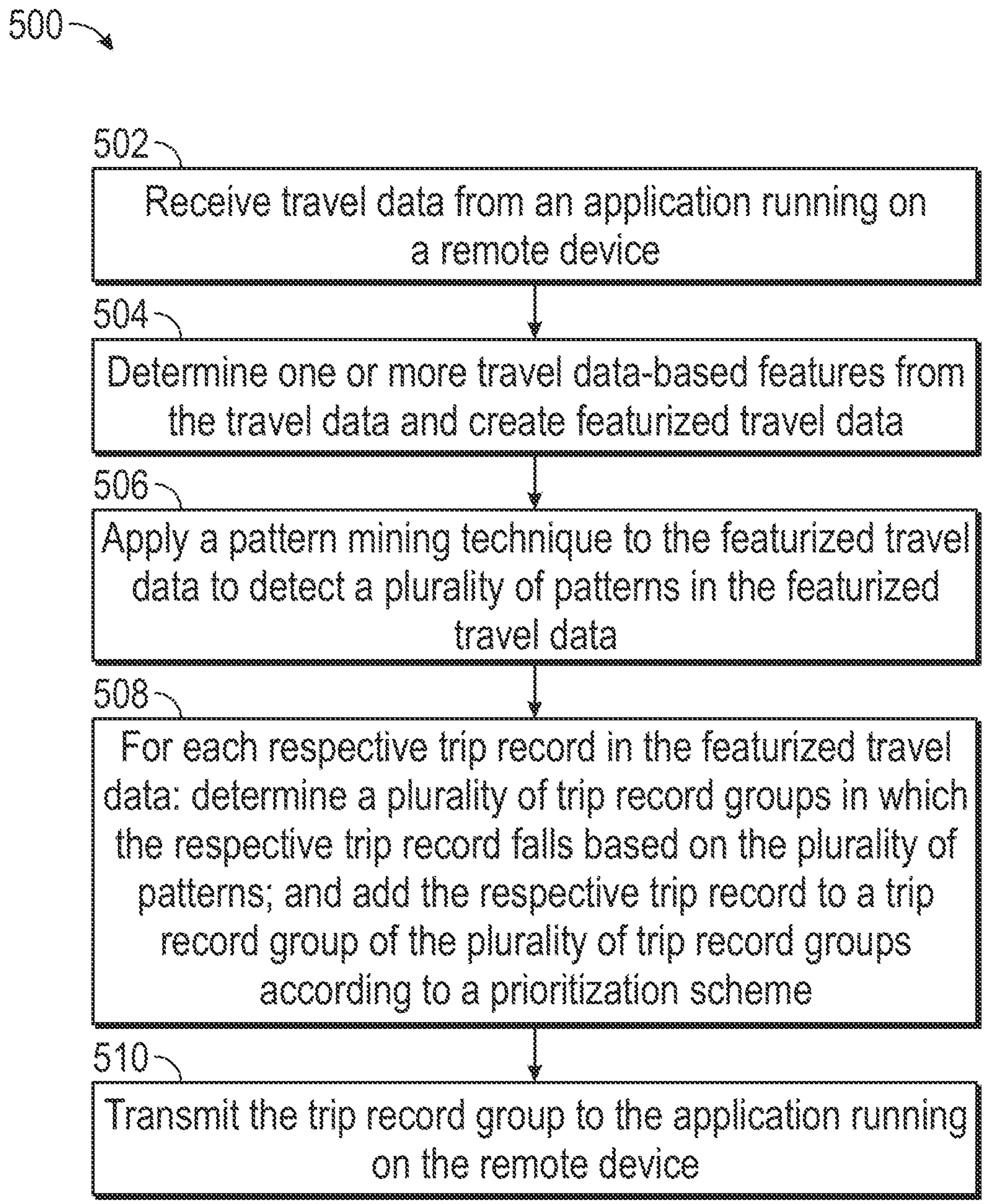
FIG. 5 depicts a method for providing grouped travel data to a user interface of an application.

FIG. 5 depicts a method 500 for providing grouped travel data to a user interface of an application.

Method 500 begins at step 502 with receiving travel data from an application running on a remote device. The travel data may be like travel data 204 described above with respect to FIG. 2. In one example, the travel data comprises a plurality of trip records, and each trip record of the plurality of trip records comprises at least a start location, an end location, and a time associated with a trip.

The remote device may be any sort of external computing device that is reachable via a data connection. In some embodiments, the remote device may be mobile device, such as a smartphone, or such as described above with respect to FIG. 1. In other embodiments, the remote device may be a laptop or desktop computer, server, or other non-mobile computing resource.

Method 500 then proceeds to step 504 with determining one or more travel data-based features from the travel data and creating featurized travel data based on the one or more travel data-based features. For example, the data may be augmented and/or featurized as described above with respect to step 208 in FIG. 2.

Method 500 then proceeds to step 506 with applying a pattern mining technique to the featurized travel data to detect a plurality of patterns in the featurized travel data. For example, the pattern mining may be as described above with respect to step 212 of FIG. 2.

Method 500 then proceeds to step 508 with, for each respective trip record in the featurized travel data, determining a plurality of trip record groups in which the respective trip record falls based on the plurality of patterns; and adding the respective trip record to a trip record group of the plurality of trip record groups according to a prioritization scheme, such as described above with respect to pattern optimization 213. For example, the trip record may be added to a trip record group based on optimized patterns as discussed above with respect to steps 213 and 214 of FIG. 2.

Method 500 then proceeds to step 510 with transmitting the trip record group to the application running on the remote device. For example, as discussed above with respect to FIG. 1, the trip record group may be sent from production database 106 to mobile device 102.

Though not depicted in FIG. 5, in some examples, method 500 may further include applying an unsupervised learning technique to the travel data in order to reduce the number of unique start and finish locations in the trip data. For example, as described above, certain locations, businesses, landmarks, hot spots, or the like may be associated with a trip record during featurization step 208 in FIG. 2.

In some examples, method 500 may further include receiving supplementary data, such as supplementary data 206 described above with respect to FIG. 2, associated with a user of the application. The supplementary data may be used for generating one or more user data-based features from the supplementary data and further augmenting the featurized travel data based on the one or more user data-based features.

In some examples of method 500, the travel data and the supplementary data are associated with a user of the application, and the plurality of patterns are specific to the user.

In some examples, method 500 may further include receiving user feedback from the application running on the remote device. Thereafter, the user feedback may be used to re-apply the pattern mining technique as described above with respect to user feedback 216 and pattern mining step 212 in FIG. 2.

In some examples, method 500 may further include calculating model metrics, such as those model metrics described above with respect to step 218 in FIG. 2. In one example, a model metric includes one or more of a confidence level, a precision metric, and a recall metric based on the user feedback. In some examples, the model metrics are stored in a data repository and may be further used to refine various prediction models. For example, where a model metric is insufficient compared to a threshold, further pattern mining and optimization may be performed, as described above with respect to steps 212 and 213 of FIG. 2. This may be useful where, for example, a new user has not yet provided enough travel data to create a pattern-based prediction model of sufficient performance according to predetermined performance thresholds.

In some examples, an apparatus, including a memory comprising executable instructions and a processor in data communication with the memory and configured to execute the executable instructions, may be configured to cause the apparatus to perform a method for providing grouped travel data to a user interface of an application, such as method 500 (or any combination of the steps described above with respect to method 500).

In some examples, a non-transitory computer-readable medium comprising instructions that when executed by a processor of an apparatus cause the apparatus to perform a method for providing grouped travel data to a user interface of an application, such as method 500 (or any combination of the steps described above with respect to method 500).

Figure 6:
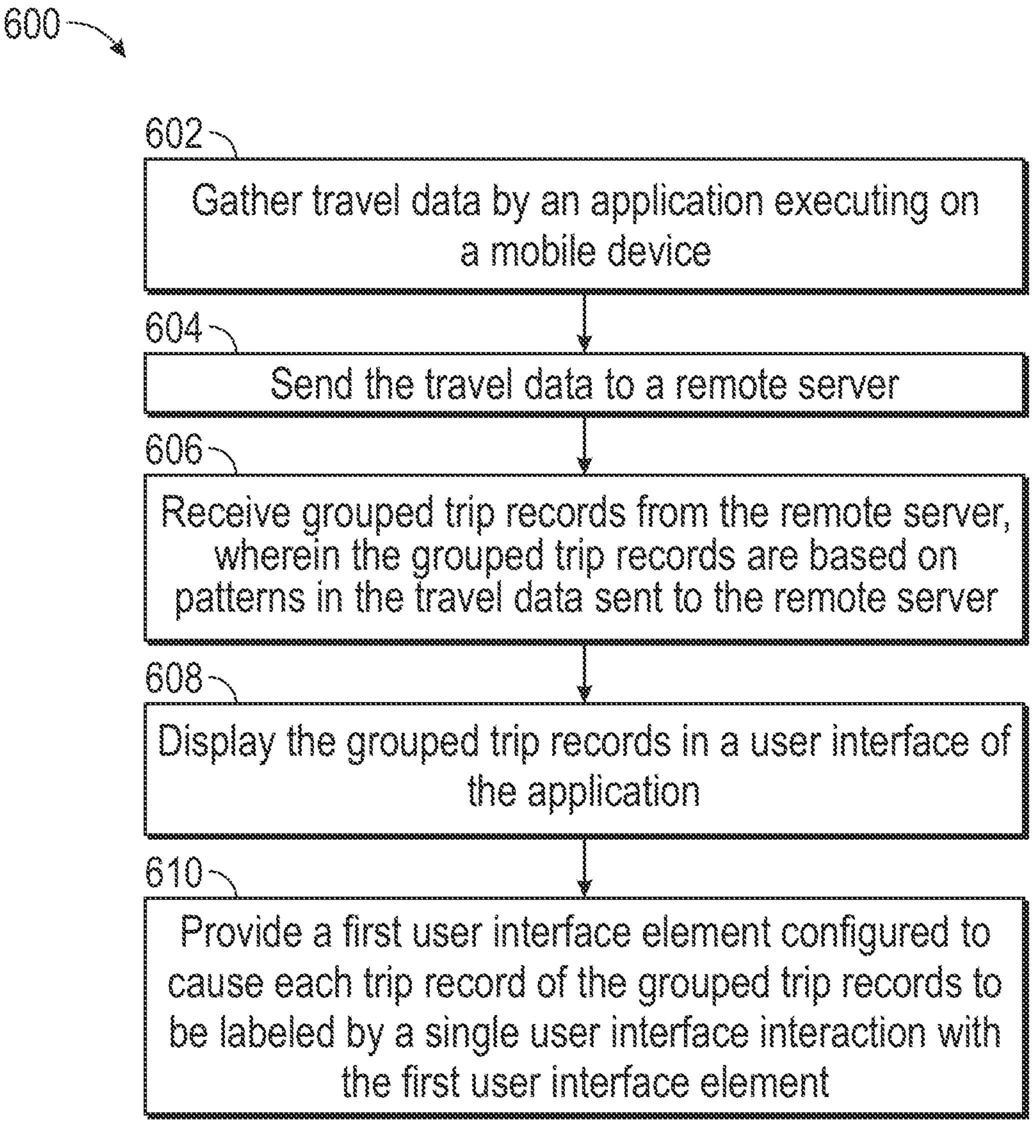
FIG. 6 depicts a method for providing grouped travel data in a user interface of an application.

FIG. 6 depicts a method 600 for providing grouped travel data in a user interface of an application. In some examples, the user interface relates to a mobile application running on a mobile device, such as a smartphone.

Method 600 beings at step 602 with gathering travel data by an application executing on a mobile device. In some examples, gathering the travel data includes using a satellite-based location determination capability of the mobile device, such as a Global Positioning System (GPS), Global Navigation Satellite System (GLONASS), or other similar satellite-based positioning system. The travel data may be like travel data 204 described above with respect to FIG. 2. In some examples, gathering travel data includes, for each trip of a plurality of trips, one or more of: determining a start location of the trip; determining an end location of the trip; determining a mileage of the trip; and determining a start time and an end time associated with the trip.

Method 600 then proceeds to step 604 with sending the travel data to a remote server. For example, the travel data may be gathered by a mobile device, such as mobile device 102 described with respect to FIG. 1, and then sent to a remote server, such a remote server hosting a production database like production database 106 in FIG. 1.

Method 600 then proceeds to step 606 with receiving grouped trip records from the remote server, wherein the grouped trip records are based on patterns in the travel data sent to the remote server. For example, as depicted in FIG. 1, mobile device 102 receives grouped travel data from production database 106.

Method 600 then proceeds to step 608 with displaying the grouped trip records in a user interface of the application. For example, the grouped trip records may be displayed in a user interface like user interface 400 described with respect to FIGS. 4A and 4B.

Method 600 then proceeds to step 610 with providing a first user interface element configured to cause each trip record of the grouped trip records to be labeled by a single user interface interaction with the first user interface element. For example, the first user interface element may be a button like 408*a* or 408*b* in FIG. 4A, which in this example are configured for labeling all trip records in the group as either "Personal" (via button 408*a*) or as "Business" (via button 408*b*).

Though not depicted, method 600 may further include detecting a user interface interaction with the first user interface element, such as a button like 408*a* or 408*b* in FIG. 4A, and thereafter transmitting user feedback to the remote server based on the user interface interaction. For example, the user interface could indicate that the predicted grouping of travel data is correct based on the user selecting a button to label all of the grouped travel data with the same label (e.g., business or personal).

In some examples, method 600 further includes receiving a user deselection of a trip record of the grouped trip records displayed in the user interface, wherein the deselection indicates that the trip record is not properly grouped with the grouped trip records. For example, as described with respect to FIG. 4A, a user can use another user interface element, such as button 406, to deselect a trip record that is in the grouped trip records 404 provided to the application. After the user deselects a trip record, user feedback based on the deselection may be sent to a remote server, such as a server hosting production database 106 in FIG. 1. The feedback may be used to further refine one or more prediction models.

In some examples, method 600 further includes receiving a user selection of an additional trip record to add to the grouped trip records displayed in the user interface, wherein the selection indicates that the additional trip record is properly grouped with the grouped trip records. Returning to FIG. 4A, a user can use another user interface element to select a trip to add to the grouped trips 404. After the user adds a trip record, user feedback based on the selection may be sent to a remote server, such as a server hosting production database 106 in FIG. 1. The feedback may be used to further refine one or more prediction models.

In some examples, method 600 includes providing a second user interface element in the user interface configured to cause the application to switch between an individual trip record review mode and a grouped trip record review mode, such as user interface element 414 depicted in FIG. 4B.

In some examples, an apparatus, including a memory comprising executable instructions and a processor in data communication with the memory and configured to execute the executable instructions, may be configured to cause the apparatus to perform a method for providing grouped travel data in a user interface of an application, such as method 600 (or any combination of the steps described above with respect to method 600).

In some examples, a non-transitory computer-readable medium comprising instructions that when executed by a processor of an apparatus cause the apparatus to perform a method for providing grouped travel data in a user interface of an application, such as method 600 (or any combination of the steps described above with respect to method 600).

Figure 7A:
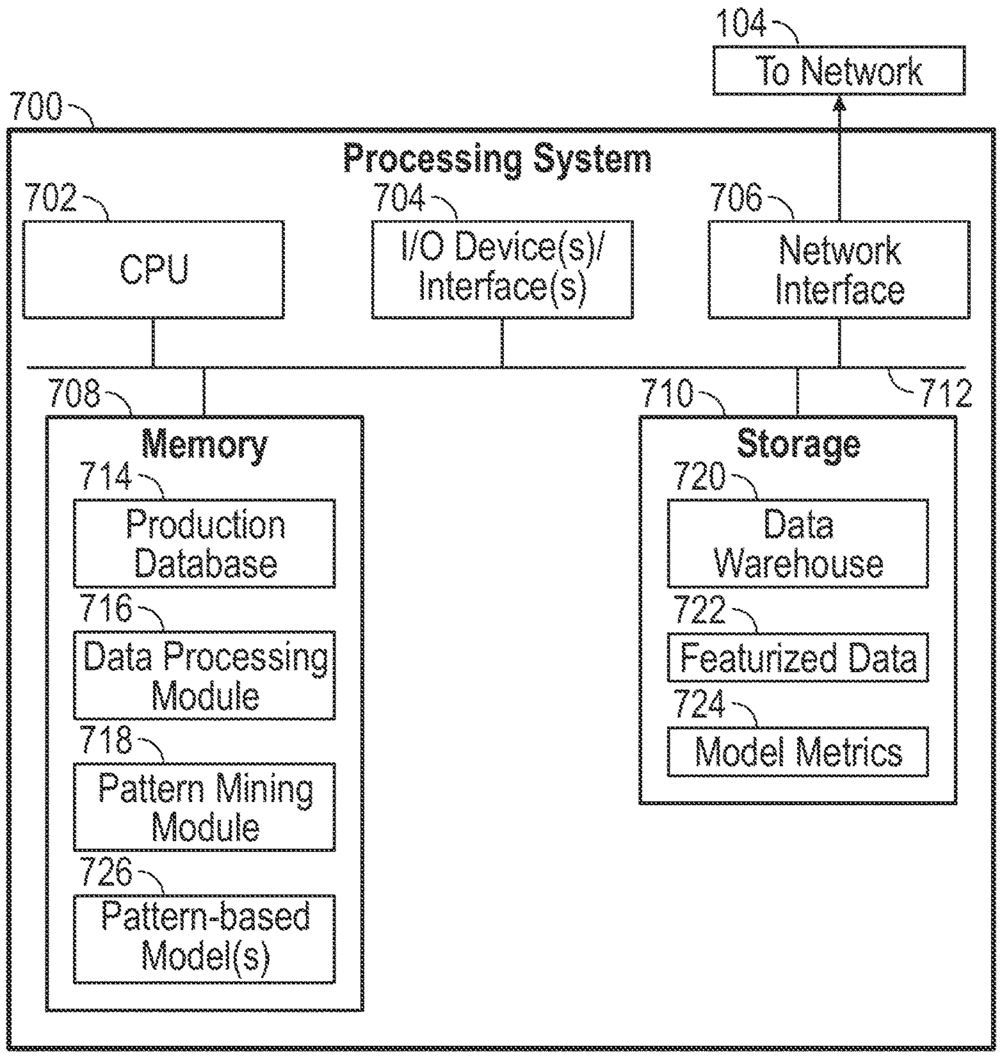
FIGS. 7A-7B depict processing systems configured to provide and use grouped travel data.

FIG. 7A depicts a processing system 700 configured to provide grouped travel data to a user interface of an application. Processing system 700 includes a CPU 702 connected to a data bus 712. CPU 702 is configured to process computer-executable instructions, e.g., stored in memory 708 or storage 710, and to cause processing system 700 to perform methods as described herein, for example with respect to FIGS. 1, 2, and 5. CPU 702 is included to be representative of a single CPU, multiple CPUs, a single CPU having multiple processing cores, and other forms of processing architecture capable of executing computer-executable instructions.

Processing system 700 further includes input/output devices and interface 704, which allows processing system 700 to interface with input/output devices, such as, for example, keyboards, displays, mouse devices, pen input, and other devices that allow for interaction with processing system 700. Note that while not depicted with independent external I/O devices, processing system 700 may connect with external I/O devices through physical and wireless connections (e.g., an external display device).

Processing system 700 further includes network interface 706, which provides processing system 700 with access to external computing devices, such as described with respect to FIG. 1.

Processing system 700 further includes memory 708, which in this example includes production database 714, which may be like production database 106 described above with respect to FIG. 1. Memory 708 also includes data processing module 716, which may be like data processing module 110 described above with respect to FIG. 1. Memory 708 also includes pattern mining module 718, which may be like pattern mining module 112 described above with respect to FIG. 1. Memory 708 also includes one or more pattern-based models 718, which may be like pattern-based models 114 described above with respect to FIG. 1. Note that while shown as a single memory 708 in FIG. 7A for simplicity, the various aspects stored in memory 708 may be stored in different physical memories, but all accessible CPU 702 via internal data connections, such as bus 712.

Processing system 700 further includes storage 710, which in this example includes data warehouse 720, which may be like data warehouse 108 described above with respect to FIG. 1. Data warehouse 720 may store, for example, travel data and supplementary data, such as travel data 204 and supplementary data 206 described above with respect to FIG. 2. Storage 710 also includes featurized data 722, which may be like featurized data 210 described above with respect to FIG. 2. Storage 710 also includes model metrics 718, which may be like model metrics described above with respect to step 218 of FIG. 2. As with memory 708, a single storage 710 is depicted in FIG. 7A for simplicity, but the various aspects stored in storage 710 may be stored in different physical storages, but all accessible to CPU 702 via internal data connections, such as bus 712.

Figure 7B:
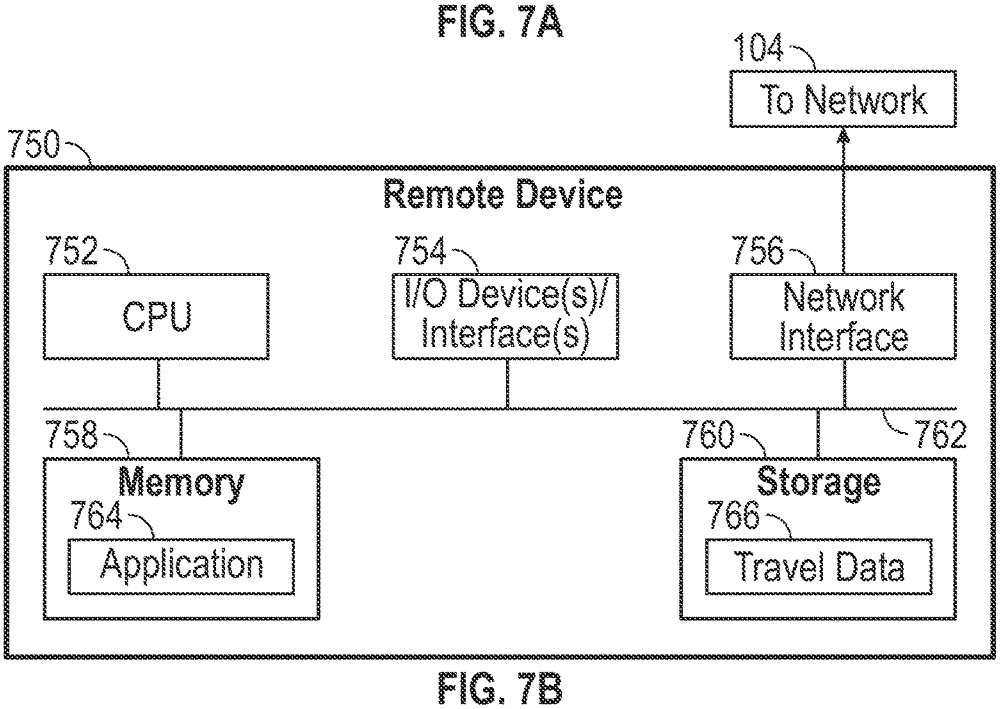

FIG. 7B depicts a remote device 750 configured to provide grouped travel data in a user interface of an application. Remote device 750 includes a CPU 752 connected to a data bus 762. CPU 752 is configured to process computer-executable instructions, e.g., stored in memory 758 or storage 760, and to cause remote device 750 to perform methods as described herein, for example with respect to FIGS. 1, 2, and 6. CPU 752 is included to be representative of a single CPU, multiple CPUs, a single CPU having multiple processing cores, and other forms of processing architecture capable of executing computer-executable instructions.

Remote device 750 further includes input/output device and interface 754, which allow, for example, a user to interact with remote device 750. For example, a user may interact with grouped travel data as described above with respect to FIGS. 3A-3D and 4A-4B. For example, an input/output device of remote device 750 may include a touch-sensitive display screen. Note that while not depicted with independent external I/O devices, remote device 750 may likewise connect with external I/O devices through physical and wireless connections (e.g., a wireless keyboard via a short-range data connection such as Bluetooth).

Remote device 750 further includes network interface 706, which provides processing system 700 with access to external computing devices, such as described with respect to FIG. 1.

Remote device 750 further includes memory 758, which in this example includes application 765, which may be, for example, a personal or business finance application with a trip tracking capability, as described above with respect to FIGS. 4A and 4B. Note that while shown as a single memory 758 in FIG. 7B for simplicity, the various aspects stored in memory 758 may be stored in different physical memories, but all accessible to CPU 752 via internal data connections, such as bus 762.

Remote device 750 further includes storage 760, which in this example includes travel data 766. In some examples, travel data 766 comprises labeled and/or unlabeled trip records as described above. As with memory 758, a single storage 760 is depicted in FIG. 7B for simplicity, but the various aspects stored in storage 760 may be stored in different physical storages, but all accessible to CPU 752 via internal data connections, such as bus 762.

The content and configuration of processing system 700 in FIG. 7A and remote device 750 in FIG. 7B are just one example, and other configurations are possible.

EXAMPLE EMBODIMENTS

The following are example embodiments. Even if single claim dependencies are indicated in the following examples, or in the claims below, all claim dependencies, including multiple claim dependencies, are included within the scope of the present disclosure.

Embodiment 1: A method for providing grouped travel data to a user interface of an application, comprising: receiving travel data comprising a plurality of trip records from an application running on a remote device; determining one or more travel data-based features from the travel data; creating featurized travel data based on the one or more travel data-based features; applying a pattern mining technique to the featurized travel data to detect a plurality of patterns in the featurized travel data; for each respective trip record in the featurized travel data: determining a plurality of trip record groups in which the respective trip record falls based on the plurality of patterns; and adding the respective trip record to a trip record group of the plurality of trip record groups according to a prioritization scheme; and transmitting the trip record group to the application running on the remote device.

Embodiment 2: The method of Embodiment 1, further comprising: selecting a subset of patterns from the plurality of patterns based on a pattern optimization scheme, wherein determining the plurality of trip record groups in which the respective trip record falls is based on the subset of the plurality of patterns.

Embodiment 3: The method of Embodiment 1 or 2, further comprising: applying an unsupervised learning technique to the featurized travel data in order to reduce a number of unique start locations and a number of unique finish locations in the featurized travel data.

Embodiment 4: The method of any of Embodiments 1-3, further comprising: receiving supplementary data associated with a user of the application; generating one or more user data-based features from the supplementary data; and augmenting the featurized travel data based on the one or more user data-based features.

Embodiment 5: The method of Embodiment 4, wherein: the travel data is associated with a user of the application, and the plurality of patterns are specific to the user.

Embodiment 6: The method of any of Embodiments 1-5, further comprising: receiving user feedback from a user of the application running on the remote device; calculating a recall metric based on the user feedback; calculating a precision metric based on the user feedback; and storing the recall metric and precision metric in a metric data repository.

Embodiment 7: The method of any of Embodiments 1-6, wherein: each respective trip record of the plurality of trip records comprises at least a start location, an end location, and a time associated with a trip.

Embodiment 8: The method of any of Embodiments 1-7, wherein the remote device is a smartphone.

Embodiment 9: An apparatus for providing grouped travel data to a user interface of an application, comprising: a memory comprising executable instructions; a processor in data communication with the memory and configured to execute the executable instructions and cause the apparatus to perform a method according to any of Embodiments 1-8.

Embodiment 10: A non-transitory computer-readable medium comprising instructions that when executed by a processor of an apparatus cause the apparatus to perform a method for providing grouped travel data to a user interface of an application, the method according to any of Embodiments 1-8.

Embodiment 11: A method for providing grouped travel data in a user interface of an application, comprising: gathering travel data by an application executing on a mobile device; sending the travel data to a remote server; receiving grouped trip records from the remote server, wherein the grouped trip records are based on patterns in the travel data sent to the remote server; displaying the grouped trip records in a user interface of the application; and providing a first user interface element configured to cause each trip record of the grouped trip records to be labeled by a single user interface interaction with the first user interface element.

Embodiment 12: The method of Embodiment 11, wherein gathering travel data comprises, for each trip of a plurality of trips: determining a start location of the trip; determining an end location of the trip; and determining a time associated with the trip.

Embodiment 13: The method of Embodiment 11 or 12, further comprising: detecting a user interface interaction with the first user interface element; and transmitting user feedback to the remote server based on the user interface interaction.

Embodiment 14: The method of any of Embodiments 11-13, further comprising: receiving a user deselection of a trip record of the grouped trip records displayed in the user interface, wherein the deselection indicates that the trip record is not properly grouped with the grouped trip records; and sending user feedback to the remote server based on the deselection.

Embodiment 15: The method of any of Embodiments 11-14, further comprising: receiving a user selection of an additional trip record to add to the grouped trip records displayed in the user interface, wherein the selection indicates that the additional trip record is properly grouped with the grouped trip records; and sending user feedback to the remote server based on the selection.

Embodiment 16: The method of any of Embodiments 11-15, further comprising: providing a second user interface element in the user interface, wherein the second user interface element is configured to cause the application to switch between an individual trip record review mode and a grouped trip record review mode.

Embodiment 17: The method of any of Embodiments 11-16, wherein gathering the travel data comprises using a satellite-based location determination capability of the mobile device.

Embodiment 18: The method of any of Embodiments 11-17, wherein the mobile device is a smartphone.

Embodiment 19: An apparatus for providing grouped travel data in a user interface of an application, comprising: a memory comprising executable instructions; a processor in data communication with the memory and configured to execute the executable instructions and cause the apparatus to perform a method according to any of Embodiments 11-18.

Embodiment 20: A non-transitory computer-readable medium comprising instructions that when executed by a processor of an apparatus cause the apparatus to perform a method for providing grouped travel data in a user interface of an application, the method according to any of Embodiments 11-18.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method, comprising:

capturing travel data comprising a plurality of trip records from an application;

transmitting, to a remote device, the captured travel data;

receiving, from the remote device, one or more trip record groups based on providing the captured travel data as input to a group prediction module comprising an ensemble of frequent pattern mining (FPM) models that detect a plurality of patterns from featurized travel data, wherein:

the ensemble of FPM models comprises a multi-user pattern-based prediction model and multiple user-specific pattern-based prediction models, each model of the ensemble of FPM models comprises a model having been trained to aggregate data based on grouping criteria learned from a training data set comprising at least one of user-specific data or data corresponding to a group of users, wherein ground truth labels for the training data set are based on user feedback received in response to previously generated trip record groups, and the plurality of patterns comprises a set of patterns selected from a universe of patterns, the set of patterns comprising a prioritized set of patterns selected based at least in part on performance metrics associated with each respective pattern in the universe of patterns;

outputting, to a user interface, the one or more trip record groups for user verification;

updating the training data set based on user feedback received in response to the outputting; and retraining the ensemble of FPM models using the updated training data.

2. The method of claim 1, further comprising:

rendering, on the user interface, a first user interface element associated with user confirmation of a grouping of trip records in the plurality of trip records and a second user interface element associated with user rejection of the grouping of trip records in the plurality of trip records, wherein the user feedback comprises interaction with one of the first user interface element or the second user interface element.

3. The method of claim 1, further comprising:

receiving supplementary data associated with a user of the application, the supplementary data comprising an additional trip record and a grouping associated with the additional trip record; and transmitting, to the remote device, the supplementary data for refining the ensemble of FPM models.

4. The method of claim 1, wherein:

the travel data is associated with a user of the application, and the plurality of patterns are specific to the user.

5. The method of claim 1, wherein: each respective trip record of the one or more trip record groups comprises at least a start location, an end location, and a time associated with a trip.

6. The method of claim 1, wherein outputting the one or more trip record groups for user verification comprises outputting the one or more trip records on a group basis or a per-trip-record basis based on selection of a toggle in the user interface.

7. A processing system, comprising:

a memory having executable instructions stored thereon; and one or more processors configured to execute the executable instructions in order to cause the processing system to:

capture travel data comprising a plurality of trip records from an application;

transmit, to a remote device, the captured travel data;

receive, from the remote device, one or more trip record groups based on providing the captured travel data as input to a group prediction module comprising an ensemble of frequent pattern mining (FPM) models that detect a plurality of patterns from featurized travel data, wherein:

the ensemble of FPM models comprises a multi-user pattern-based prediction model and multiple user-specific pattern-based prediction models, each model of the ensemble of FPM models comprises a model having been trained to aggregate data based on grouping criteria learned from a training data set comprising at least one of user-specific data or data corresponding to a group of users, wherein ground truth labels for the training data set are based on user feedback received in response to previously generated trip record groups, and the plurality of patterns comprises a set of patterns selected from a universe of patterns, the set of patterns comprising a prioritized set of patterns selected based at least in part on performance metrics associated with each respective pattern in the universe of patterns;

output, to a user interface, the one or more trip record groups for user verification;

updating the training data set based on user feedback received in response to the outputting; and retraining the ensemble of FPM models using the updated training data.

8. The processing system of claim 7, wherein the one or more processors are further configured to cause the processing system to:

render, on the user interface, a first user interface element associated with user confirmation of a grouping of trip records in the plurality of trip records and a second user interface element associated with user rejection of the grouping of trip records in the plurality of trip records, wherein the user feedback comprises interaction with one of the first user interface element or the second user interface element.

9. The processing system of claim 7, wherein the one or more processors are further configured to cause the processing system to:

receive supplementary data associated with a user of the application, the supplementary data comprising an additional trip record and a grouping associated with the additional trip record; and transmit, to the remote device, the supplementary data for refining the ensemble of FPM models.

10. The processing system of claim 7, wherein:

the travel data is associated with a user of the application, and the plurality of patterns are specific to the user.

11. The processing system of claim 7, wherein: each respective trip record of the one or more trip record groups comprises at least a start location, an end location, and a time associated with a trip.

12. The processing system of claim 7, wherein to output the one or more trip record groups for user verification, the one or more processors are configured to cause the processing system to output the one or more trip records on a group basis or a per-trip-record basis based on selection of a toggle in the user interface.

13. A non-transitory computer-readable medium comprising instructions that when executed by a processor of an apparatus cause the apparatus to perform an operation comprising:

capturing travel data comprising a plurality of trip records from an application;

transmitting, to a remote device, the captured travel data;

receiving, from the remote device, one or more trip record groups based on providing the captured travel data as input to a group prediction module comprising an ensemble of frequent pattern mining (FPM) models that detect a plurality of patterns from featurized travel data, wherein:

the ensemble of FPM models comprises a multi-user pattern-based prediction model and multiple user-specific pattern-based prediction models, each model of the ensemble of FPM models comprises a model having been trained to aggregate data based on grouping criteria learned from a training data set comprising at least one of user-specific data or data corresponding to a group of users, wherein ground truth labels for the training data set are based on user feedback received in response to previously generated trip record groups, and the plurality of patterns comprises a set of patterns selected from a universe of patterns, the set of patterns comprising a prioritized set of patterns selected based at least in part on performance metrics associated with each respective pattern in the universe of patterns;

outputting, to a user interface, the one or more trip record groups for user verification;

updating the training data set based on user feedback received in response to the outputting; and retraining the ensemble of FPM models using the updated training data.

14. The non-transitory computer-readable medium of claim 13, wherein the operations further comprise:

rendering, on the user interface, a first user interface element associated with user confirmation of a grouping of trip records in the plurality of trip records and a second user interface element associated with user rejection of the grouping of trip records in the plurality of trip records, wherein the user feedback comprises interaction with one of the first user interface element or the second user interface element.

15. The non-transitory computer-readable medium of claim 13, wherein the operations further comprise:

receiving supplementary data associated with a user of the application, the supplementary data comprising an additional trip record and a grouping associated with the additional trip record; and transmitting, to the remote device, the supplementary data for refining the ensemble of FPM models.

16. The non-transitory computer-readable medium of claim 13, wherein:

the travel data is associated with a user of the application, and the plurality of patterns are specific to the user.

17. The non-transitory computer-readable medium of claim 13, wherein: each respective trip record of the one or more trip record groups comprises at least a start location, an end location, and a time associated with a trip.

* * * * *